March 9, 1965　　　W. M. BROOKS　　　3,172,692
SHACKLE SEAL
Filed June 6, 1962　　　　　　　　　　　　　2 Sheets-Sheet 1
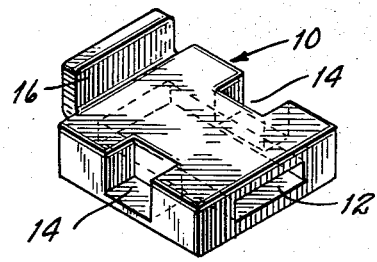
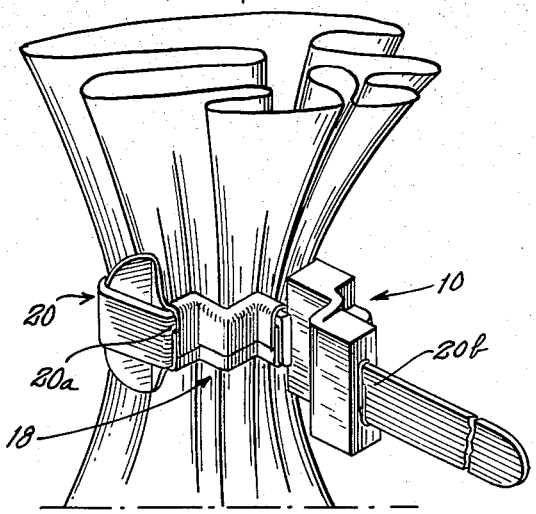
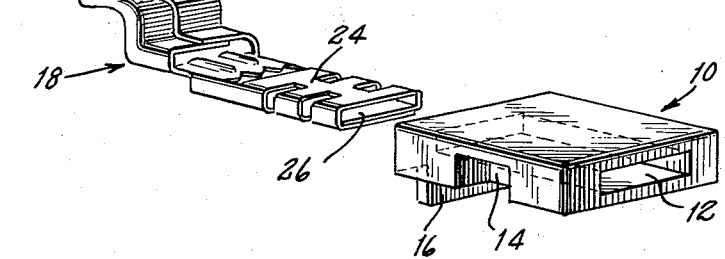
INVENTOR:
WINFRED M. BROOKS
BY
Robert Henderson
ATTORNEY March 9, 1965 W. M. BROOKS 3,172,692
SHACKLE SEAL
Filed June 6, 1962 2 Sheets-Sheet 2

INVENTOR:
WINFRED M. BROOKS
BY
Robert Henderson
ATTORNEY

United States Patent Office 3,172,692
Patented Mar. 9, 1965

3,172,692
SHACKLE SEAL
Winfred M. Brooks, West Orange, N.J., assignor to E. J. Brooks Company, Newark, N.J., a corporation of New Jersey
Filed June 6, 1962, Ser. No. 200,496
3 Claims. (Cl. 292—311)

This invention relates to shackle seals and, more particularly, to an improved sealing element, commonly made of lead, for use as a part of such a seal. The invention is disclosed herein, for illustrative purposes, as embodied in a seal for closing and sealing the neck of a bag, without, however, limiting the invention to a bag seal.

Such sealing elements, ordinarily, undergo substantial deformation by a sealing tool to clinch or grip tightly a cord or equivalent shackle element extending therethrough. There has, hitherto, been no provision for precise application of such a tool upon such a sealing element with at least two undesirable results, (1) the tool may deform the sealing element at a relatively strong area rather than at a relatively weak area so that deformation may not be sharp enough to cause the shackle to be gripped as tightly as desired, and (2) the tool, when operated, may unintentionally engage and damage a related part of the seal, either impairing the effect of the seal for closing and sealing a related bag or container, or leading to a false conclusion that the bag or container and its contents may have been subjected to tampering.

The principal object of this invention is the provision of an improved seal employing a tape as a shackle, and having means for locating a sealing tool accurately upon the seal's sealing element so that the latter may be properly deformed and the mentioned disadvantages of prior seals avoided.

More particularly, this invention aims to provide an improved shackle seal which includes a deformable sealing element having means integral therewith for properly locating a sealing tool upon it to assure proper clinching deformation thereof and for preventing the sealing tool from damaging a related tape shackle.

This invention achieves the stated objects by providing such a deformable sealing element which has an integral lip serving as an abutment against which the sealing tool may be placed to locate it accurately upon the sealing element and as a protective barrier between the sealing tool and a related tape shackle.

In the accompanying drawings:

FIGURE 1 is a perspective view of an improved deformable sealing element for use as part of a shackle seal according to a preferred embodiment of this invention.

FIG. 2 is a partly exploded, perspective view of a bag seal according to this invention as at an intermediate stage in its manufacture. This seal, except as it includes the present inventive concepts, corresponds substantially to the improved seal disclosed and claimed in the copending application of Winfred M. Brooks and Sigurd M. Moberg, Serial No. 101,300, filed April 6, 1961, patented January 14, 1964, Patent No. 3,117,812, from which further details may be ascertained if desired.

FIG. 3 is a perspective view of the seal of FIG. 2 as applied to the neck of a bag.

FIG. 4 being as before deformation of the sealing element and FIG. 5 being as after such deformation.

Figure 4:
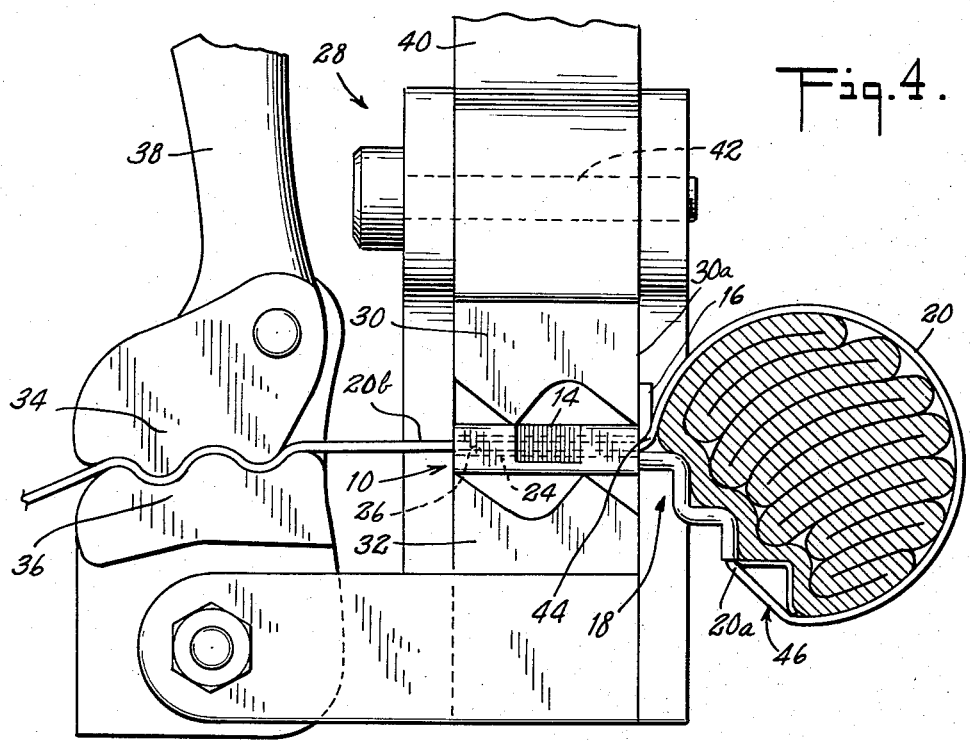
FIGS. 4 and 5 are side elevational views of the seal of FIGS. 2 and 3, in association with a bag neck (shown in cross-section) and with a sealing tool.

As shown in FIG. 1, a deformable sealing element 10, is a solid block of deformable lead or other suitable deformable material which will substantially retain any shape to which it is deformed. The block is of relatively flat, cubical shape having a generally oblong or rectangular passage 12 extending endwisely, completely therethrough. Intermediate its ends, the block may be formed with opposite side recesses 14 which somewhat weaken that intermediate area to make it more easily deformable.

An important feature of this invention is the provision of an abutment which is shown in FIGS. 1, 2, 4 and 5 as an upstanding lip 16, cast or otherwise formed as an integral part of the block 10 at one end and at a relatively broad side thereof.

The seal of FIGS. 2-5 includes a sheet metal element 18, cut, folded and clinched as illustrated. During manufacture of the seal, one end portion 20a of a length of strong tape 20 is firmly clinched within a folded tape-attaching portion 22 of the sheet metal element, the other end 20b of the tape being free until the seal is put into use. To complete manufacture of the seal, a sealing portion 24 of the sheet metal element is pushed endwisely into the passage 12 of the block 10, the fit thereinto being tight enough to prevent unintended disassociation of the block from the sheet metal element. In the seal, as thus ready for use, the relationship of the block's recesses 14 and lip 16 is as shown in FIG. 4, and as may be visualized from FIG. 2.

In use, the tape 20 is passed around the neck of the bag, as in FIG. 4, and the tape end 20b is pushed endwisely through a passage 26 in the sealing portion 24 of the sheet metal element, the tape upon entering said passage, passing between the heel of the lip 16 and the metal of the sheet metal element 18 at the point where the latter protrudes from the sealing block 10.

After the seal has thus been assembled and partly closed about the neck of the bag, the free end 20b of the tape is pulled manually to bring the latter closely about the bag neck. In this condition of the seal, a sealing tool 28 is applied thereto as shown in FIG. 4, with the block 10 (and, within it, the sheet metal sealing portion 24 and a part of the tape 20) between open jaws 30 and 32 of the tool and the lip 16 of the block in abutting relationship with a side face 30a of the jaw 30. Upon initial association of the tool 28 with the seal, the end 20b of the tape is extended between the open tape-tightening jaws 34 and 36 of the tool, whereafter, by clockwise (as viewed) pivoting of jaw 34 by its handle 38, the two latter jaws tightly grip the tape end 20b and pull the tape very tightly about the bag neck. This pulling of the tape, moreover, gives assurance that the lip 16 is in firm abutment association with the jaw 30.

Figure 5:
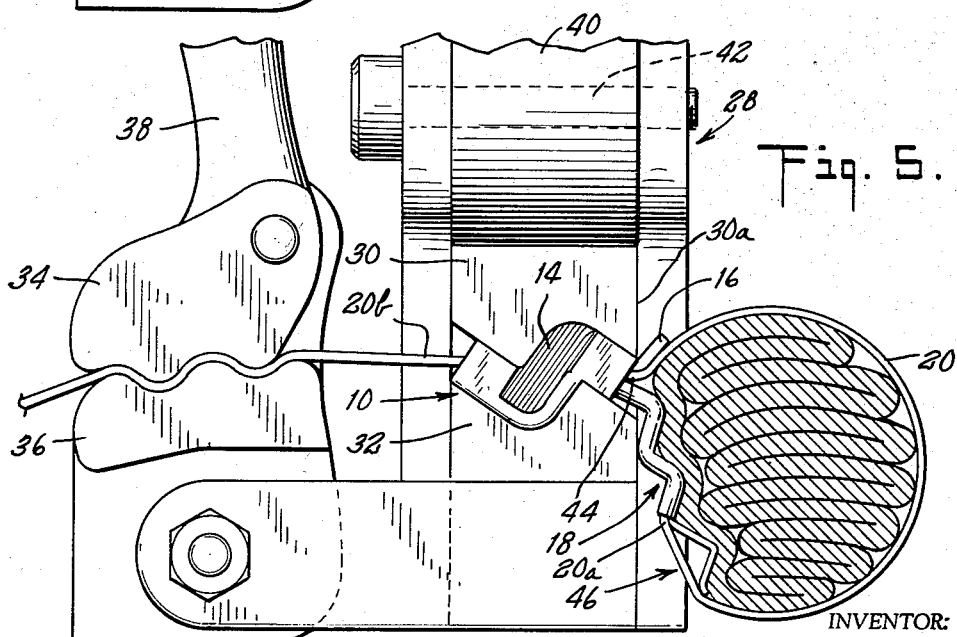

After tightening of the tape about the bag neck, the clinching lever 40 is pivoted about its pivot pin 42 and away from the viewer so that, in a manner well understood by those familiar with the subject art, the lever 40 causes a cam action upon jaw 30 to force the latter downwardly to deform the block 10 and clinch the sheet metal and tape portions within the block to the zig-zag or S-shape dictated by the shapes of the cooperating faces of the latter jaws, as shown in FIG. 5.

Application of the seal being thus completed, the tool's jaws are opened and the tool then removed. It may be observed that by the described and illustrated precise positioning of the tool upon the block 10, the deformation of the latter occurs, as desired, at the weaker area of the block where the recesses 14 are located.

In the absence of abutment means within this invention, the tool could be properly placed only by accident or with great difficulty so that in many instances the tool might deface or damage the sheet metal element 18 and/or cause the seal to be so inadequately clinched as to permit the tape to slide within the block and become loosened and thus rendered openable by an interloper without leaving evidence of tampering.

It may be observed that when the jaws 30, 32 of the tool close upon the block 10, the latter's lip 16 may bend to some extent away from the main part of the block. This bending, as well as the nature of the block's deformation causes the lip 16 to lie snugly against an adjacent part of the tape, as shown in FIG. 5, rather than to protrude objectionably therefrom. It will be seen from FIGS. 4 and 5 that the lip 16 lies between the tool's jaw 30 and the tape 20, thereby positively preventing cutting of or other damage to the tape by the sealing tool. Also where the initially free part of the tape enters the block, as at 44, the adjacent rounded outer surface of the heel of the lip 16 prevents weakening and breaking of the tape at that point.

As explained in said copending application, the seal may be removed from the bag at the proper time, by cutting the tape with a knife at point 46, the underlying sheet metal of element 18 at that point serving to protect the bag against being accidentally cut by the knife.

It should be understood that the concepts disclosed herein may be employed in other ways without departing from the invention as set forth in the following claims.

I claim:

1. A seal comprising a deformable sealing element of such stiffness as to require use of a tool to effect deformation thereof, and tape shackle adapted to extend through a passage in said element; said element having an integral projection against which the tool may abut to locate the tool relatively to said element and being located at one end of said element between the tool and the tape to protect the latter against damage by the tool.

2. A seal comprising a deformable sealing element of such stiffness as to require use of a tool to effect deformation thereof, a tape, a sheet metal element having a first portion toward one end thereof to which one end portion of said tape is fixed, and a second portion toward the other end of the sheet metal element, said second portion being within a passage extending longitudinally completely through said sealing element and having an opening coaxial with said passage; the other end portion of said tape being insertable through said opening, and said second portion of the sheet metal element and the tape therewithin being deformable, with deformation of the sealing element, to clinch the tape within the two mentioned elements; said sealing element having an integral upstanding projection at the end thereof adjacent to said first portion of the sheet metal element and extending transversely of said sealing element and in parallelism with the broad faces of said other end portion of the tape when the seal is in use, whereby to constitute an abutment against which the tool may bear to locate it properly upon the sealing element in applying the seal to an object and to constitute, also, a protective barrier between the tool and an adjacent part of said other end portion of the tape.

3. A shackle seal comprising a deformable sealing element of flat rectangular shape in transverse section and of such stiffness as to require use of a tool to effect deformation thereof, and a tape of which one longitudinal portion is connected to said sealing element and another longitudinal portion which, to form a shackle loop, is extendible through a rectangular passage which extends longitudinally through said sealing element and is of sufficiently larger transverse sectional dimensions than the tape to accommodate the latter therein; said sealing element having an upstanding integral lip extending transversely of and parallel to said passage at the end of the sealing element nearest to said loop and at a larger side face of said sealing element which is at the outer side of said loop in use of the seal, whereby said lip serves as an abutment for locating the tool upon the sealing element in applying the seal to an object and is disposed as a barrier between the tool and the tape to protect the latter against damage.

References Cited by the Examiner
UNITED STATES PATENTS

| 1,151,509 | 8/15 | Brooks | 292—308 |
| 2,639,754 | 5/53 | Macy. | |
| 2,709,613 | 5/55 | Moberg | 292—325 |

ALBERT H. KAMPE, Primary Examiner.

M. HENSON WOOD, Jr., Examiner.